United States Patent
An et al.

(10) Patent No.: US 11,254,584 B2
(45) Date of Patent: *Feb. 22, 2022

(54) METHOD FOR INHIBITING EXTRACTANT DEGRADATION OF DSX PROCESS THROUGH METAL EXTRACTION CONTROL

(71) Applicant: KOREA RESOURCES CORPORATION, Wonju-si (KR)

(72) Inventors: Jeon Woong An, Wonju-si (KR); Youn Kyu Yi, Wonju-si (KR); Young Hun Kim, Gwangmyeong-si (KR)

(73) Assignee: KOREA RESOURCES CORPORATION, Wonju-si (KR)

( * ) Notice: Subject to any disclaimer, the term of this patent is extended or adjusted under 35 U.S.C. 154(b) by 333 days.

This patent is subject to a terminal disclaimer.

(21) Appl. No.: 16/523,286

(22) Filed: Jul. 26, 2019

(65) Prior Publication Data

US 2021/0024367 A1   Jan. 28, 2021

(51) Int. Cl.
| | |
|---|---|
| C01G 51/00 | (2006.01) |
| C01G 49/00 | (2006.01) |
| C01G 49/02 | (2006.01) |
| C22B 19/20 | (2006.01) |
| C01G 9/00 | (2006.01) |
| C22B 3/00 | (2006.01) |
| C01F 7/34 | (2006.01) |

(52) U.S. Cl.
CPC .............. *C01G 51/003* (2013.01); *C01F 7/34* (2013.01); *C01G 9/003* (2013.01); *C01G 49/0009* (2013.01); *C01G 49/02* (2013.01); *C22B 19/20* (2013.01); *C22B 23/0461* (2013.01)

(58) Field of Classification Search
CPC .. C01G 49/0009; C01G 49/02; C01G 51/003; C01G 9/003; C22B 19/20; C22B 19/26; C22B 23/0461; C22B 3/26; C22B 3/30; C01F 7/34

See application file for complete search history.

(56) References Cited

U.S. PATENT DOCUMENTS

| | | | |
|---|---|---|---|
| 2008/0038168 A1* | 2/2008 | Cheng | C22B 23/0453 423/24 |
| 2018/0105896 A1* | 4/2018 | Yoneyama | C22B 23/00 |

* cited by examiner

*Primary Examiner* — Steven J Bos
(74) *Attorney, Agent, or Firm* — Cantor Colburn LLP

(57) ABSTRACT

Provided is a method for inhibiting extractant degradation in the DSX process through the metal extraction control, the method comprising steps of: (a) adding limestone to a copper solvent extraction-raffinate to precipitate iron (Fe) and aluminum (Al) as a slurry, recovering a clarifying liquid; and (b) adding sulfuric acid to the recovered clarifying liquid to adjust the pH thereof.

6 Claims, 4 Drawing Sheets

(a) Adding limestone to a copper solvent extraction-raffinate to precipitate iron (Fe) and aluminum (Al) as a slurry, recovering a clarifying liquid (b) Adding sulfuric acid to the clarifying liquid to adjust the pH thereof (c) Further adding seawater to the clarifying liquid to adjust the temperature thereof.

METHOD FOR INHIBITING EXTRACTANT DEGRADATION OF DSX PROCESS THROUGH METAL EXTRACTION CONTROL

BACKGROUND OF THE INVENTION

1. Field of the Invention

The present invention relates to a method for inhibiting an extractant degradation, and more particularly, to a method for effectively inhibiting the extractant degradation by minimizing the extraction of metal, which is a main impurity for the extractant degradation through pH and temperature controls in cobalt/zinc solvent extraction (synergistic solvent extraction, hereinafter referred to as "DSX") process of Boleo mine.

2. Description of the Related Art

The DSX process is a process for simultaneously extracting cobalt (Co) and zinc (Zn) using two solvents. In order to increase the extraction rate, soda ash ($Na_2CO_3$) is added to adjust the optimum pH.

The soda ash added by the above-mentioned method increases the extraction rate by adjusting the pH, but it reacts with cobalt or manganese so that cobalt carbonate ($CoCO_3$) or manganese carbonate ($MnCO_3$) are precipitated to lower the extraction rate and to cause degradation of the extractant, resulting in difficulty to recover cobalt and zinc.

The higher the pH adjusted by the above-mentioned method, the higher the extraction rate of cobalt (Co) and zinc (Zn) to be recovered. However, the extraction rate of manganese, cadmium and copper ions acting as impurities becomes higher as well.

The manganese extracted by the above-mentioned method is the leading cause the degradation of the oxime, which is an extractant, and the high manganese extraction causes the degradation of the extractant in the DSX process.

When the extractant is decomposed by the above-mentioned method, the extracted impurities (cobalt, zinc, manganese, cadmium, copper ions, etc.) overload the extraction capacity of the oxime in extractants, which increases the mol total metal/mol oxime to accelerate the degradation of extractants.

When the degradation of the extractant is accelerated by the above-mentioned method, the extraction capacity of the oxime in the process is decreased, thereby also reducing the extraction rate of cobalt and zinc to be recovered.

If the extraction rate is lowered by the abovementioned method when operating the process, it tends to increase a pH higher than the optimum pH for increasing the extraction rate. However, this accelerates the degradation of the extractant. the degradation of the extractant and causes a vicious cycle of the process.

When the extraction rate is lowered the extractant needs to be continuously fed in an amount equal to or greater than the decomposed amount. The degradation of the extractant is accelerated, thereby requiring an additional feed of an enormous amount of extractant. If this deteriorates further, the degradation of the extractant cannot be reversed, and the DSX process must be stopped. If the DSX process is re-operated, it will incur enormous economic losses because all the solvents (all the decomposed extractants) input into the DSX process are removed and re-input into the DSX process.

In general solvent extraction, metals should be extracted up to the maximum capacity of the extractant in view of an economic point, but the DSX process cannot be operated in the same manner as conventional solvent extraction to prevent degradation of the extractant due to overloading of the extraction capacity.

For example, in the copper solvent extraction, copper is extracted up to the maximum capacity of the extractant while maintaining an appropriate pH. The above-mentioned method has an economic advantage in that an extractant is not required to be excessively added to the process. In addition, it is economical to prevent the extraction of iron acting as an impurity in the subsequent step and further eliminate the process of removing the impurities.

However, if valuable metals are extracted while using the maximum amount of extractant in the DSX process as in general solvent extraction, it causes an overload of the oxime among extractants and increases the mol total metal/mol oxime, thereby causing degradation of the extractant. Due to the different operating methods as described, the DSX process suffers from the difficulty to operate in the same manner as conventional solvent extraction.

SUMMARY OF THE INVENTION

An object of the present invention is to provide a novel method for controlling pH and temperature of Boleo cobalt/zinc solvent extraction feed solution to minimize the extraction of metal, which is a cause of the extractant degradation and effectively to inhibit the extractant degradation.

The present invention provides the method for inhibiting extractant degradation in the DSX process through the metal extraction control, the method comprising steps of: (a) adding limestone to a copper solvent extraction-raffinate to precipitate iron (Fe) and aluminum (Al) as a slurry, recovering a clarifying liquid; and (b) adding sulfuric acid to the recovered clarifying liquid to adjust the pH thereof.

Further, the present invention provides the method for inhibiting extractant degradation in the DSX process through the metal extraction control in which the method further includes, after step (b), (c) adding seawater to the clarifying liquid to adjust the temperature thereof.

Further, the present invention provides the method for inhibiting extractant degradation in the DSX process through the metal extraction control in which the copper solvent extraction-raffinate including valuable metals includes cobalt (Co) and zinc (Zn), the raffinate further includes iron (Fe), aluminum (Al) and manganese (Mn), and the raffinate further includes at least one of cadmium (Cd) copper (Cu), potassium (K), magnesium (Mg), calcium (Ca), sodium (Na), and nickel (Ni).

Further, the present invention provides the method for inhibiting extractant degradation in the DSX process through the metal extraction control in which the DSX solvent of step (a) is a mixture of an extractant and kerosene, which is a diluent, and the extractant includes aliphatic hydroxy oxime and neodecanoic acid in a volume ratio of 1:0.5 to 4.0.

Further, the present invention provides the method for inhibiting extractant degradation in the DSX process through the metal extraction control in which the concentration of sulfuric acid in step (b) is 10 g/L to 200 g/L.

Further, the present invention provides the method for inhibiting extractant degradation in the DSX process through the metal extraction control in which, in step (b), the sulfuric acid is added to adjust the pH of the clarifying liquid so as to have the pH of 3 to 6, and the sulfuric acid is not added to the precipitated slurry.

Further, the present invention provides the method for inhibiting extractant degradation in the DSX process through the metal extraction control in which, in step (c), the seawater is added to adjust the temperature of the clarifying liquid so as to have the temperature of 30° C. to 50° C.

Further, the present invention provides the method for inhibiting extractant degradation in the DSX process through the metal extraction control in which, in step (c), the DSX feed solution, recovered with iron removal, includes cobalt (Co) and zinc (Zn), the feed solution further includes aluminum (Al) and manganese (Mn), and the feed solution further includes at least one of cadmium (Cd) copper (Cu), potassium (K), magnesium (Mg), calcium (Ca), sodium (Na), and nickel (Ni).

The present invention has effects of minimizing the extraction of metal, which is a cause of the extractant degradation and effectively inhibiting the extractant degradation through controlling pH and temperature of Boleo cobalt/zinc solvent extraction feed solution.

DETAILED DESCRIPTION OF THE PREFERRED EMBODIMENT

Hereinafter, embodiments of the present invention are described in detail with reference to the accompanying drawings, which will be readily apparent to those skilled in the art to which the present invention pertains. The present invention may be embodied in many different forms and is not limited to the embodiments described herein.

Figure 1:
FIG. 1 is a flow chart of a method for inhibiting the DSX extractant degradation in a DSX process through metal extraction control of the present invention.
Figure 1:

FIG. 1 is a flow chart of a method for inhibiting the extractant degradation in a DSX process through metal extraction control of the present invention.

The method for inhibiting extractant degradation in the DSX process through the metal extraction control according to the present invention includes (a) adding limestone to a copper solvent extraction-raffinate to precipitate iron (Fe) and aluminum (Al) as a slurry, recovering a clarifying liquid; and (b) adding sulfuric acid to the recovered clarifying liquid to adjust the pH thereof.

The method may include, after step (b), step (c) of further adding seawater to the clarifying liquid to adjust the temperature thereof.

In this regard, the copper solvent extraction-raffinate containing valuable metals includes cobalt (Co) and zinc (Zn), the raffinate further includes iron (Fe), aluminum (Al) and manganese (Mn), and the raffinate further includes at least one of cadmium (Cd), copper (Cu), potassium (K), magnesium (Mg), calcium (Ca), sodium (Na), and nickel (Ni).

In step (a), the copper solvent extraction-raffinate containing valuable metals may include cobalt, zinc, and the like. In the valuable metals contained in the copper solvent extraction-raffinate, the amount of cobalt is about 100 ppm to about 300 ppm, and the amount of zinc is about 500 ppm to about 1000 ppm. However, they are contained together with other impurities, and themselves may be worthless.

The copper solvent extraction-raffinate includes impurities such as manganese (Mn), cadmium (Cd), copper (Cu), iron (Fe), potassium (K), magnesium (Mg), calcium (Ca), sodium (Na), aluminum (Al) and nickel (Ni). In step (a), the limestone is added to the copper solvent extraction-raffinate.

In step (a), in order to remove iron and aluminum from raffinate, which is copper solvent extraction-raffinate including valuable metals, limestone having a solid-liquid concentration of 20% by weight to 30% by weight, preferably 25% by weight may be added so as to allow the raffinate to have pH of 4 or more, preferably, pH of 4.5 to 6, more preferably pH of 5 to 5.5.

After adding the limestone, in order to adjust the temperature of the liquid to be 30° C. to 60° C., preferably 35° C. to 50° C., more preferably about 40° C., the mixture is reacted for 0.5 hours to 4 hours, preferably 1.5 hours to 3.5 hours, more preferably about 3 hours.

In this regard, the pH is adjusted to remove iron in the form of $Fe_2(SO_4)_3$ or $Fe(OH)_3$ and aluminum in the form of $Al(OH)_3$, minimizing the formation of crud which is a precipitate impurity in the DSX process.

A feature of the process is that it is capable of selectively recovering valuable metal sulfides of cobalt and zinc from manganese, a major impurity.

Figure 2:
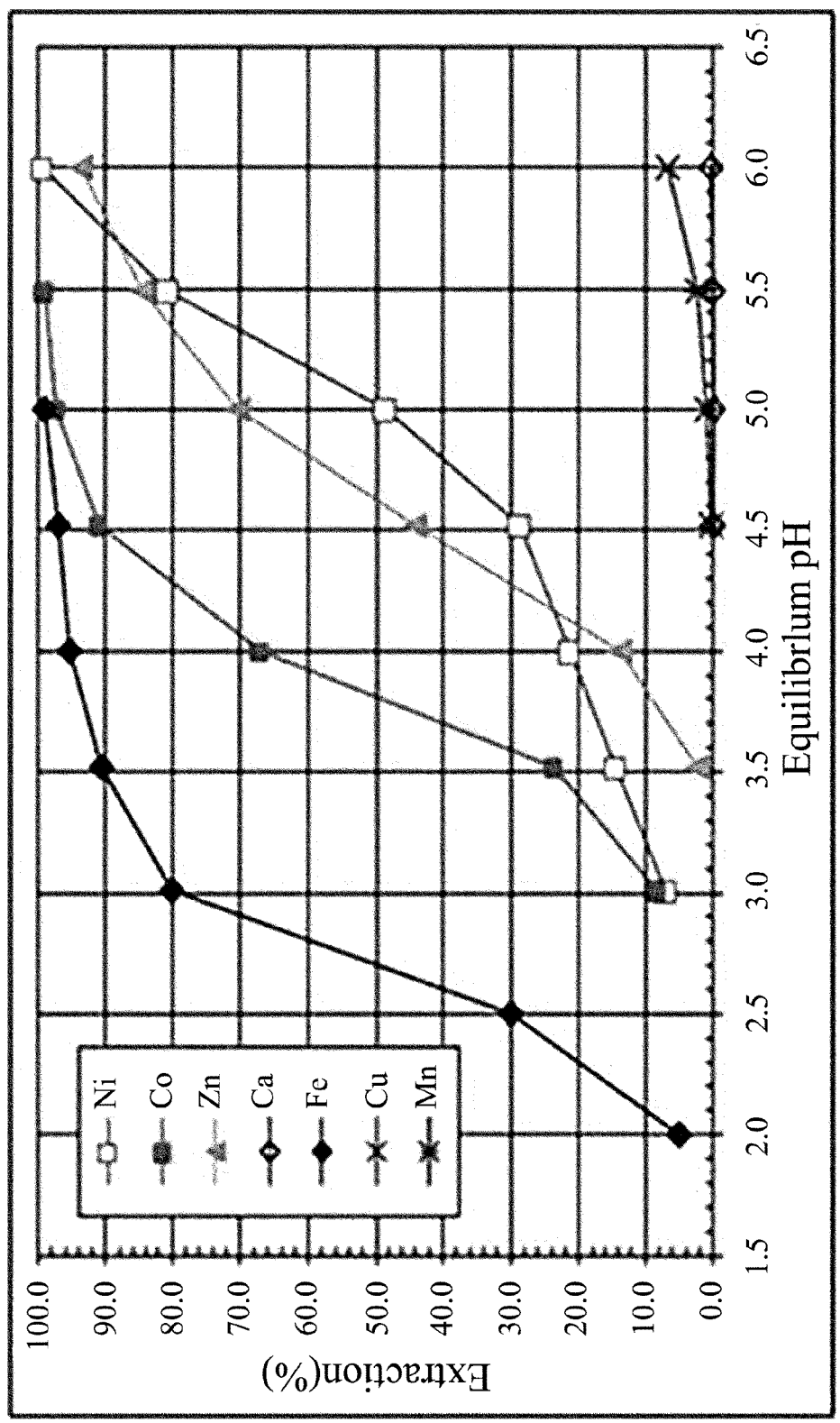
FIG. 2 shows the extraction isotherm curve according to one embodiment of the present invention.

FIG. 2 shows the extraction isotherm curve according to one embodiment of the present invention.

This graph is a graph showing the metal extraction rate according to pH change at the same temperature. In this graph, the starting pH and the limiting pH of the extraction are indicated, and the pH range used as an index of the operation is shown. This graph indicates that cobalt is extracted into the solvent in the range of pH 3 to pH 5.5, and the extraction rate is higher as the pH is closer to 5.5.

Zinc is extracted into the solvent in the range of pH 3.5 to pH 6. As the pH is closer to the higher region, manganese, calcium, nickel and copper, which are impurities, are extracted into the solvent. Thus, pH control is necessary.

In order to avoid the impurities such as manganese and copper, and to recover the maximum amount of cobalt and zinc, the pH used as an indicator of the operation in the DSX process is adjusted to 4 to 5.

The reaction scheme of the above reaction is carried out according to the following reaction formula so that iron and aluminum may be removed from the copper solvent extraction-raffinate.

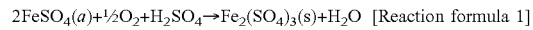
$2FeSO_4(a)+½O_2+H_2SO_4 \rightarrow Fe_2(SO_4)_3(s)+H_2O$ [Reaction formula 1]

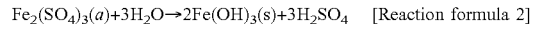
$Fe_2(SO_4)_3(a)+3H_2O \rightarrow 2Fe(OH)_3(s)+3H_2SO_4$ [Reaction formula 2]

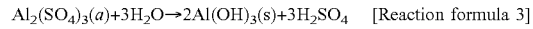
$Al_2(SO_4)_3(a)+3H_2O \rightarrow 2Al(OH)_3(s)+3H_2SO_4$ [Reaction formula 3]

Further, when iron and aluminum has been removed by the reaction formulas, step (a) may be repeated several times. Thereafter, a clarifier, which is a purifier, is used to remove the iron and aluminum as a slurry from the suspension containing the precipitated iron and aluminum, recovering the clarifying liquid.

However, after the iron and aluminum are removed as the slurry, the pH of the clarifying liquid is adjusted to a high level of 4 to 6.

Therefore, the present invention includes, after step (a), step (b) of adding sulfuric acid to the recovered clarifying liquid to adjust the pH thereof.

In other words, in order to selectively add sulfuric acid to the slurry and clarifying liquid separated after step (a), the sulfuric acid is added to the point where the supernatant is separated in the clarifier, thereby adjusting the pH.

That is, in step (b), sulfuric acid is added only to the supernatant, and thus, the sulfuric acid is not added to the slurry separated from the suspension to prevent the re-dissolution of iron and aluminum, which are impurities.

Figure 3:
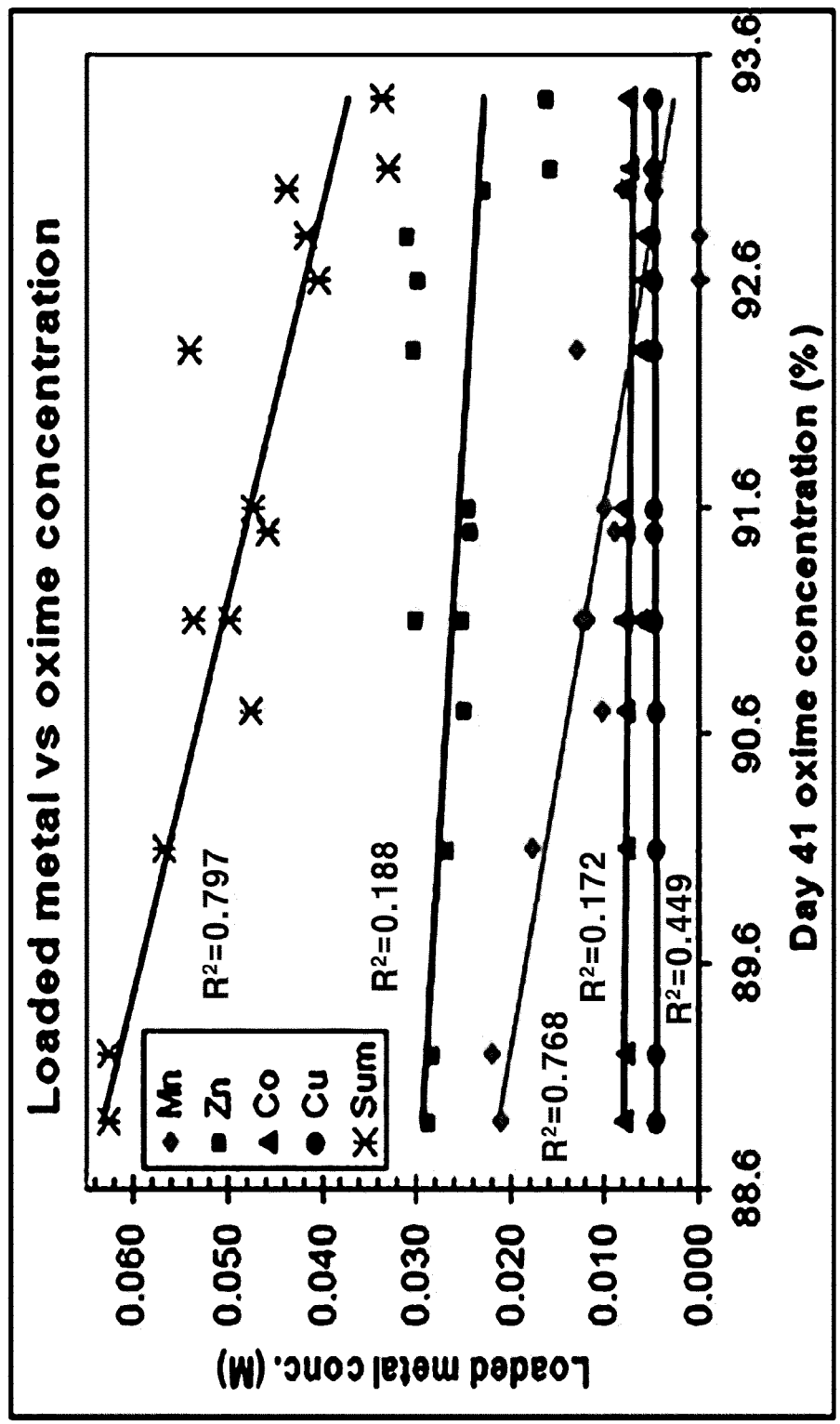
FIG. 3 shows the correlation between the metal concentration and the oxime concentration contained in the solvent according to an embodiment of the present invention.

FIG. 3 shows the correlation between the metal concentration and the oxime concentration contained in the solvent according to an embodiment of the present invention.

In FIG. 3, each point shows the individual experimental result (each metal according to color) based on 41 days of a unit experimental day. FIG. 3 is a graph showing the concentration of oxime after 41 days according to the concentration of each metal.

The higher the amount of metal loading in the solvent, the lower the concentration of oxime, indicating that the more the metal is extracted (loaded), the faster the degradation of the solvent.

Therefore, it is important to lower the overall metal content in the DSX process to prevent oxime overload. In the DSX process feed solution and the extraction step, pH adjustment is necessary in conjunction with the extraction isotherm curve in FIG. 1 to prevent the total amount of metal loading from increasing by adjusting the pH. Further, the recovery rate should be considered from an economic point. Thus, it is not possible to lower the pH unconditionally in order to lower the metal amount, and it is important to maintain the balance of an appropriate level of pH and an appropriate concentration of oxime.

In the present invention, the method of minimizing metal extraction to inhibit the extractant degradation may include step (b) of adding, to the separated clarifying liquid, the sulfuric acid having a concentration of 10 g/L to 200 g/L, preferably 50 g/L to 150 g/L, and more preferably 75 g/L to 125 g/L.

Further, in step (b), the sulfuric acid may be added to the clarifying liquid to adjust the pH of 3 to 6, preferably pH of 3.5 to 5.5, and more preferably pH of 4 to 5.

In step (b), the sulfuric acid may be added to adjust the pH, and the metal extraction may be inhibited in the DSX process.

However, the temperature of the clarifying liquid with the pH adjusted is kept as high as 40° C. to 50° C.

Therefore, the present invention includes step (c) of adding seawater to the pH-adjusted clarifying liquid to control the temperature thereof after step (b).

In step (c), the seawater may be put into the pH-adjusted clarifying liquid reservoir to adjust the clarifying liquid temperature to be 30° C. to 50° C., preferably 30° C. to 45° C., and more preferably 30° C. to 40° C.

Consequently, in step (c), the temperature of the clarifying liquid can be adjusted by the seawater input.

Figure 4:
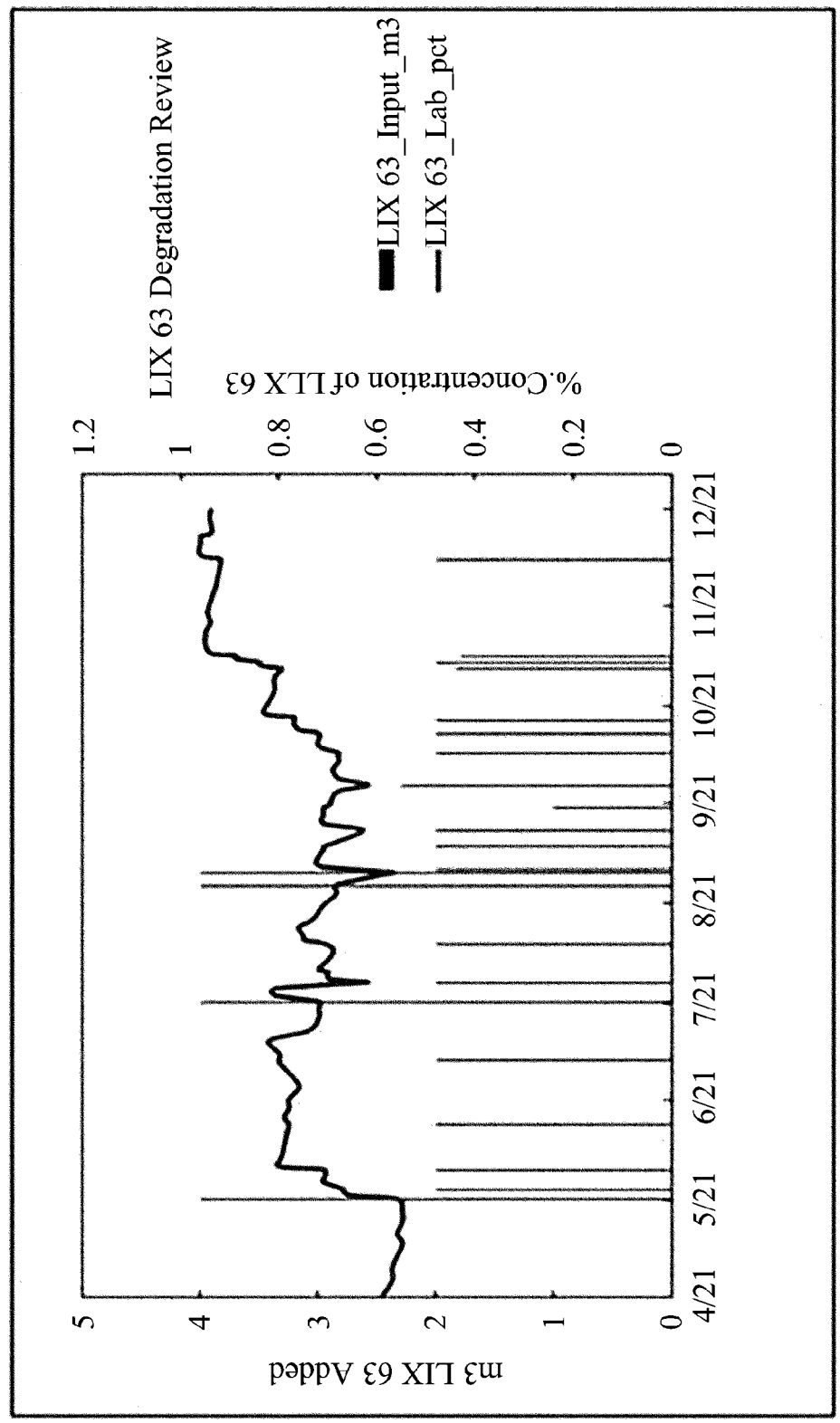
FIG. 4 shows the inhibition of the extractant degradation according to one embodiment of the present invention.

FIG. 4 shows the inhibition of the extractant degradation according to one embodiment of the present invention.

As shown in FIG. 4, the basic y-axis of the graph is the input amount ($m^3$) of the extractant oxime (LIX 63), and the auxiliary y-axis of the graph is the analysis result of oxime (%).

When the pH is maintained low, and the mol total metal/mol oxime is kept low in association with the above-described pH adjustment and the graph of the mol total metal/mol oxime, even when a similar amount of oxime is added, the oxime concentration (%) is increased, and the amount of the solvent degradation is decreased.

A high oxime concentration means a high mol oxime, and it can be seen that a low value of mol total metal/mol oxime is maintained, indicating a virtuous cycle.

The mol oxime is increased, and the mol total metal/mol oxime is lowered, and thus the degradation is reduced so that the oxime concentration is kept high. When the extractant is added, the mol total metal/mol oxime is further lowered.

In this regard, the DSX feed solution in which iron is removed and recovered includes cobalt (Co) and zinc (Zn) the solution further includes aluminum (Al) and manganese (Mn), and the solution further includes at least one of cadmium (Cd), copper (Cu), potassium (K), magnesium (Mg), calcium (Ca), sodium (Na) and nickel (Ni).

Further, the present invention can prolong the lifetime of the extractant used in the DSX process by the above-described method of inhibiting the extractant degradation.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description. Therefore, the spirit of the present invention should not be limited to the above-described embodiments, and the following claims as well as all modified equally or equivalently to the claims are intended to fall within the scope and spirit of the invention.

What is claimed is:

1. A method for inhibiting extractant degradation in a DSX process, the method comprising steps of:
   (a) adding limestone to a copper solvent extraction-raffinate to precipitate iron (Fe) and aluminum (Al) as a slurry; and
   (b) adding sulfuric acid to the copper solvent extraction-raffinate from which iron (Fe) and aluminum (Al) have been precipitated to adjust the pH thereof.

2. The method of claim 1, wherein the method further includes, after step (b), (c) further adding seawater to the copper solvent extraction-raffinate from which iron (Fe) and aluminum (Al) have been precipitated to adjust the temperature thereof.

3. The method of claim 1, wherein the copper solvent extraction-raffinate of step (a) includes cobalt (Co) and zinc (Zn), wherein the raffinate further includes manganese (Mn), and wherein the raffinate further includes at least one of cadmium (Cd), copper (Cu), potassium (K), magnesium (Mg), calcium (Ca), sodium (Na), and nickel (Ni).

4. The method of claim 1, wherein the concentration of sulfuric acid in step (b) is 10 g/L to 200 g/L.

5. The method of claim 1, wherein, in step (b), the sulfuric acid is added to adjust the copper solvent extraction-raffinate from which iron (Fe) and aluminum (Al) have been precipitated so as to have the pH of 3 to 6, and the sulfuric acid is not added to the precipitated slurry.

6. The method of claim 2, wherein, in step (c), the seawater is added to adjust the copper solvent extraction-raffinate from which iron (Fe) and aluminum (Al) have been precipitated so as to have a temperature of 30° C. to 50° C.

* * * * *